United States Patent
Gurley et al.

(10) Patent No.: US 6,972,806 B2
(45) Date of Patent: Dec. 6, 2005

(54) METHOD AND APPARATUS FOR PREVENTING DATA CORRUPTION FROM VIDEO RELATED ENHANCEMENTS

(75) Inventors: Thomas David Gurley, Indianapolis, IN (US); William John Testin, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 516 days.

(21) Appl. No.: 10/204,737

(22) PCT Filed: Dec. 21, 2000

(86) PCT No.: PCT/US00/34680

§ 371 (c)(1),
(2), (4) Date: Aug. 22, 2002

(87) PCT Pub. No.: WO01/72051

PCT Pub. Date: Sep. 27, 2001

(65) Prior Publication Data

US 2003/0020831 A1 Jan. 30, 2003

Related U.S. Application Data

(60) Provisional application No. 60/190,206, filed on Mar. 17, 2000.

(51) Int. Cl.[7] .......................... H04N 5/268; H04N 9/77

(52) U.S. Cl. ...................... 348/705; 348/465; 348/663

(58) Field of Search .............................. 348/705, 706, 348/465, 468, 663, 665, 554, 555, 558

(56) References Cited

U.S. PATENT DOCUMENTS

| 4,802,000 | A | * | 1/1989 | Willis | 348/706 |
|---|---|---|---|---|---|
| 4,996,597 | A | * | 2/1991 | Duffield | 348/705 |
| 5,018,013 | A | * | 5/1991 | Rabii | 348/706 |
| 5,369,498 | A | | 11/1994 | Banno et al. | 358/342 |
| 5,907,369 | A | * | 5/1999 | Rumreich et al. | 348/566 |
| 5,982,453 | A | * | 11/1999 | Willis | 348/607 |

(Continued)

FOREIGN PATENT DOCUMENTS

EP 0306646 3/1989 ............ H04N 9/79

(Continued)

OTHER PUBLICATIONS

Patent Abstracts of Japan, vol. 017, No. 069, Feb. 10, 1993 & JP 4-271688.

*Primary Examiner*—Victor R. Kostak
(74) *Attorney, Agent, or Firm*—Joseph S. Tripoli; Robert D. Shedd; Paul P. Kiel (57) ABSTRACT

An apparatus and a method for processing auxiliary data included in a video signal, in particular auxiliary data included in the vertical blanking interval of a television signal. The present invention recognizes that comb filtering of a television signal before processing the auxiliary data included in the television signal may cause corruption of the data. The present invention overcomes the problems associated with the data corruption by placing the takeoff point for the auxiliary data at a point in the signal path prior to the comb filtering. In an exemplary embodiment, the present invention also provides for switching between one of a plurality of signal sources while ensuring that the signal provided to an auxiliary data processor corresponds to the displayed signal and minimizing the additional hardware and software required with regard to prior art arrangements.

2 Claims, 5 Drawing Sheets

U.S. PATENT DOCUMENTS 5,995,160 A * 11/1999 Rumreich .................... 348/564
6,067,123 A * 5/2000 Lee ............................ 348/554
6,201,580 B1 * 3/2001 Voltz et al. .................. 348/584
6,393,194 B1 * 5/2002 Mikami et al. ............... 386/46

FOREIGN PATENT DOCUMENTS

EP          0766467     4/1997    .......... H04N 7/035
JP          4-271688    9/1992    ............ H04N 7/08

* cited by examiner

| SWITCH LINE | COMPOSITE SWITCH | | Y/C SWITCHES | | Y/C OUT | CC_VID |
|---|---|---|---|---|---|---|
| | CTL 1 | CTL 2 | CTL 1 | CTL 2 | | |
| | NONE | COMP_VID_SW | COMB_SVID_SW | NONE | | |
| TV | GND | 0 | 1 | GND | TV | X |
| AUX | GND | 1 | 1 | GND | AUX | X |
| S-VIDEO | GND | X | 0 | GND | S-VIDEO | X |

FIG. 4a

| SWITCH LINE | COMPOSITE SWITCH | | Y/C SWITCHES | | Y/C OUT | CC_VID |
|---|---|---|---|---|---|---|
| | CTL 1 | CTL 2 | CTL 1 | CTL 2 | | |
| | COMB_SVID_SW | COMP_VID_SW | COMB_SVID_SW | NONE | | |
| TV | 0 | 0 | 1 | GND | TV | TV |
| AUX | 0 | 1 | 1 | GND | AUX | AUX |
| S-VIDEO | 1 | 0 | 0 | GND | S-VIDEO | S-VID-Y |

METHOD AND APPARATUS FOR PREVENTING DATA CORRUPTION FROM VIDEO RELATED ENHANCEMENTS

This application claims the benefit under 35 U.S.C. § 365 of International Application PCT/US00/34680, filed Dec. 21, 2000, which was published in accordance with PCT Article 21(2) on Sep. 27, 2001 in English; and which claims benefit of U.S. provisional application Ser. No. 60/190,206 filed Mar. 17, 2000.

BACKGROUND OF THE INVENTION

1. Field of the Invention

The invention relates to a method and an apparatus for processing video signals, and in particular, to a method and an apparatus for processing data services information in a video signal when a comb filter is used to process the video signal.

2. Description of Related Art

Processing of television signals generally requires the separation, or recovery, of luminance and chrominance components of the television signal. For example, an NTSC color television signal includes a brightness, or luminance, frequency (Y) signal ranging in frequency from direct current to a nominal bandwidth of 4.2 MHz, and a 3.58 MHz color subcarrier that is modulated in phase and amplitude to represent hue and saturation of the image. The luminance information contained in an image is represented by signal frequencies that are concentrated about integral multiples of the horizontal line scanning frequency. The chrominance information is encoded or inserted in a portion of the luminance signal spectrum around frequencies that lie halfway between the multiples of the line scanning frequency, i.e., at odd multiples of one-half the line scanning frequency.

The chroma and luma information may be separated and recovered from a composite signal using a comb filtering approach. In a typical comb filter approach, a composite video signal is subtracted from a second composite video signal which has been delayed by one horizontal scan. Since two successive lines (with respect to horizontal synchronization pulses) of NTSC chroma subcarrier are 180 out of phase, the chroma inputs combine as a subcarrier sum. Since the lines of luminance are originally in phase, the combination of the opposite phase luminance components result in cancellation of luminance. Thus, the combination produces a chroma component in which stationary luma components have been phase canceled. In addition, the separated chroma component is subtracted (without further phase reversal) from the composite video input signal (luma+chroma) to produce a separated luma component. Since the lines of chrominance are in phase, the phase cancellation of chrominance components produces a separated luminance output signal.

Additionally, it has become increasingly common in the television broadcast industry to insert data services information in the vertical blanking interval ("VBI") of the television signal in between the active intervals. The data services information can provide a variety of extended services that may not necessarily relate to the display or program information included in the video signal. Examples of such inserted information includes, but is not limited to, GemStar, Teletext based on the NABTS specification, and closed caption data.

However, inserting data services information from unrelated sources into the VBI can present a problem for television sets that utilize comb filters, particularly if the information from the various sources is present on adjacent lines of the video signal. As noted above, an inherent property of the comb filtering method involves the summing and processing of information on the current line presented to the comb filter with the information on the previous line, or the next line in the case of three line comb filters. When the information on adjacent lines are necessarily related, such as in the case of standard display or programming information during the active video interval, the combing function properly separates the luminance and the chrominance components of the composite signal. However, when the information on adjacent lines are unrelated, which may be the case when various service providers insert different service information in the VBI, combing of the different information can corrupt the information provided by one of more of the service providers.

Figure 1:
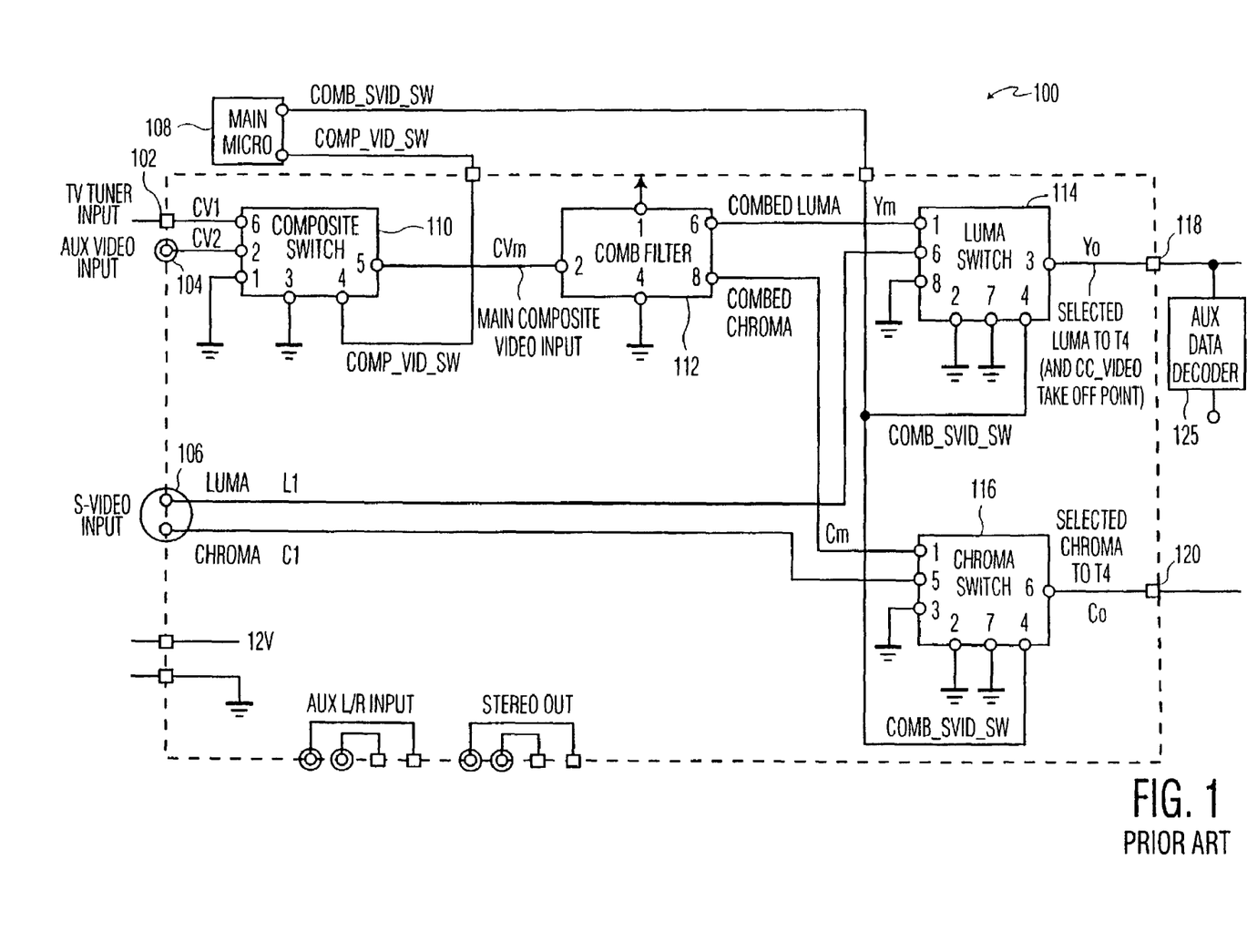
FIG. 1 is a block diagram of a television signal processing arrangement that includes a comb filter and may be susceptible to data corruption.

FIG. 1 illustrates a conventional television arrangement, wherein different information on adjacent lines can result in corrupted data output. Arrangement 100 includes comb filter 112 and an auxiliary data decoder 125 having a take off point disposed at a point in the signal path downstream of comb filter 112. In this case, auxiliary data processor 125 receives the combed luma output from a takeoff point coupled to the output of luma switch 114. It has been discovered that in the arrangement of FIG. 1, different information on adjacent lines may become corrupted. For example, GemStar data is corrupted by NABTS data when NABTS data line is adjacent a GemStar data line. The data rate for NABTS data is 174 nsec/bit, which corresponds to a frequency of about 2.86 MHz. Since the 2.86 MHz data is within the chroma passband of comb filter 112, the data is combed out and summed with the GemStar data on the adjacent line. The result is that the GemStar data is summed with a 2.86 MHz periodic component. This periodic component corrupts the GemStar data and results in a considerable increase in the percentage of GemStar data downloading errors.

The arrangement of FIG. 1 is relatively common, wherein the auxiliary data take off point was chosen such that closed caption video would always correspond to the displayed video for any selected input. The displayed video may correspond to an output from a selected one of TV tuner input 102, auxiliary video input 104 and S-video input 106. The displayed video is derived from the signals provided on output lines 118 and 120. Output line 118 is the first point in the system common to the three input sources 102, 104 and 106. The arrangement of FIG. 1 guarantees that the closed caption information will match the displayed video, but this arrangement has the disadvantage that the auxiliary data take off point is downstream of comb filter 112. Such an arrangement is not a problem when the system is designed to only process closed caption video information in the VBI. However, for the reasons noted above, such an arrangement may result in corrupted data when handling auxiliary data from a variety of sources on adjacent lines.

One proposed solution to the above-described problem is to disable comb filter 112 during the VBI. An example of such a solution is described in U.S. Pat. No. 5,907,369, entitled "TELEVISION SYSTEM FOR DISPLAYING MAIN AND AUXILIARY IMAGES WITH COLOR ERROR CORRECTION PROVISIONS," which issued May 25, 1999, and is assigned to the assignee of the present application.

Figure 2:
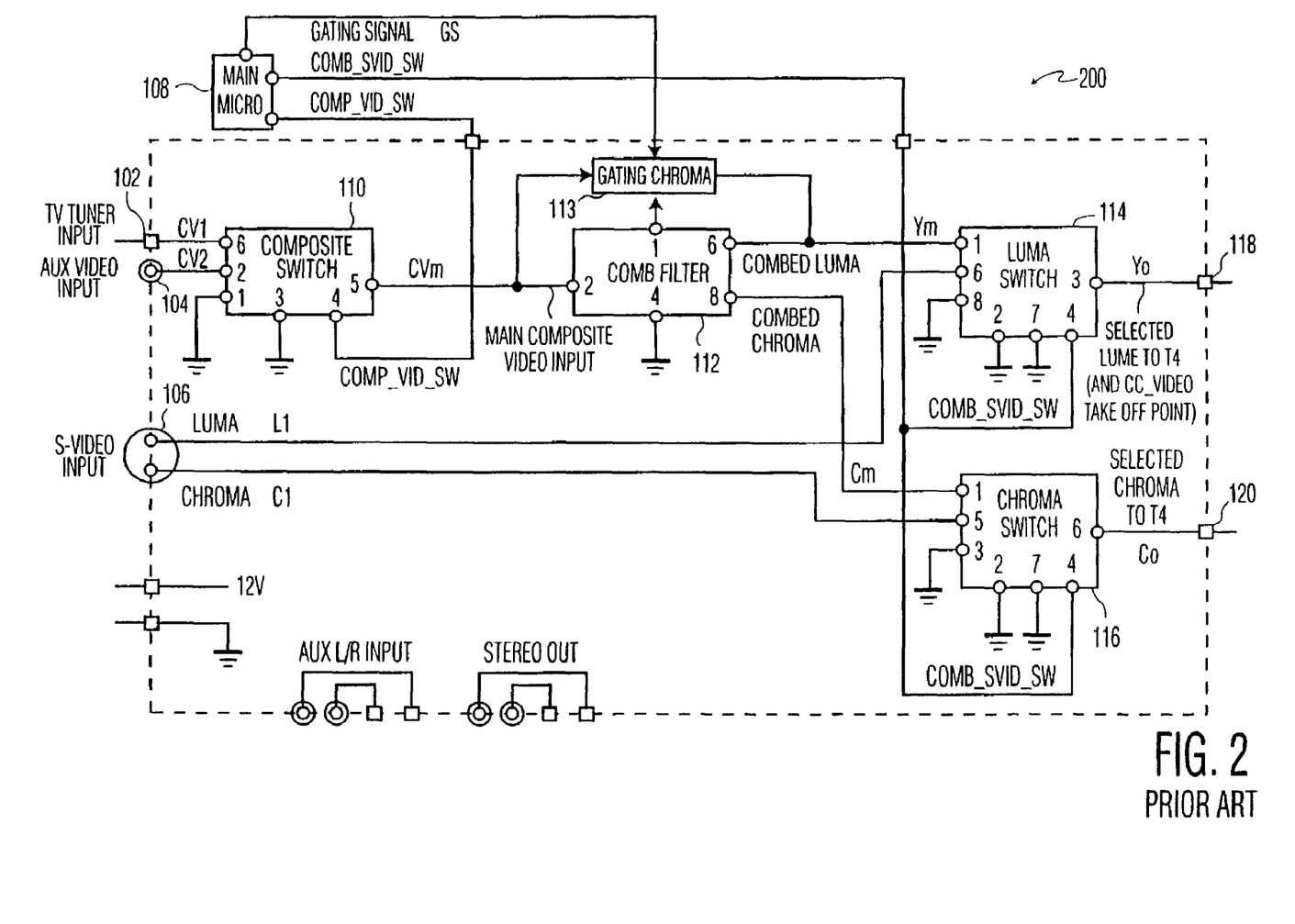
FIG. 2 is a block diagram of a television signal apparatus that includes a bypass coupled to the comb filter.

Another proposed solution to the above-described problem is to bypass comb filter 112 during the VBI. An example of such a solution is shown in FIG. 2, wherein gating circuit 113, which bypasses comb filter 112 during the VBI, is coupled between the main composite video input and the combed luma output of comb filter 112. To bypass comb filter 112, the output CVm of composite switch 110 is fed directly to the combed luma input of luma switch 114 through gating circuit 113. Gating signal GS from main microprocessor 108 controls the operation of gating circuit 113. At times other than the VBI, the gating is inactive and gating circuit 113 does not affect normal circuit operation in the path between composite switch 110, comb filter 112 and luma switch 114. An example of this solution is described in U.S. patent application Ser. No. 08/722,574, entitled "COMB FILTER WITH BYPASS MODE", filed on Sep. 27, 1996, and assigned to the assignee of the present application. However, adding an additional gating circuit and switching control signals requires additional hardware and software to accommodate the new switching arrangement. Therefore, it is desirable to provide a method and arrangement that overcomes the above-noted problems associated with a comb filter in the signal path while minimizing the need for additional hardware and software.

EP0766467A2 discloses an arrangement wherein microcontroller IC 10 is disposed between video switch 18 and television signal processing circuit 14. This reference relates to the operation of a closed caption decoder that is controlled using a deflection signal during a mode of operation when deflection signals are not available.

U.S. Pat. No. 5,369,498 discloses an arrangement for allowing a video data signal to pass through to a D/A converter without passing through a Y/C separator in response to a gate signal. The '498 patent specifically relates to processing of video data signals from a video disk. As such, the '498 patent does not teach or suggest any specific arrangements for selecting one of a plurality of input signals while preventing data corruption.

BRIEF SUMMARY OF THE INVENTION

The present invention resides, in part, in the recognition by the inventors that in a comb filtering arrangement the above-noted problems may be overcome by placing the auxiliary data take off point at a point in the system prior to comb filtering. Advantageously, it is herein recognized that an output of a composite video switch, which output is provided to a comb filter, can be used as the auxiliary data take off point.

In one aspect, the present invention is an apparatus for processing video signals, comprising: a signal source for providing a signal having a first component that includes video program information and a second component that includes auxiliary data information; a comb filter having an input coupled to the signal source for receiving the signal and comb filtering the signal to provide a luma signal and a chroma signal at respective first and second outputs; and a data processor, having an input for receiving the signal, for decoding auxiliary data included in the second component of the signal and providing a decoded output signal, characterized in that the input of the data processor is coupled to a take off point disposed between the source of the video signal and the comb filter input, whereby the auxiliary data decoder receives the signal prior to comb filtering of the signal to prevent corruption of the auxiliary data by the comb filter.

In a further aspect of the invention, the signal source comprises a composite switch having a first input coupled to a television tuner, a second input coupled to an auxiliary video source, a third input coupled to a controller, and an output for providing a video signal from a selected one of the inputs in response to a control signal from the controller.

In a further aspect of the invention, the source of the video signal further comprises a fourth input for receiving a luma signal from a S-video signal source.

In a further aspect, the invention further comprises a luma switch, having a first input for receiving the luma output signal from the comb filter, a second input for receiving the luma signal from the S-video signal source, and a third input for receiving a second control signal from the controller and an output for providing a selected one of the combed luma output and the luma signal from the S-video signal source in response thereto, and a chroma switch, having a first input for receiving the chroma output signal from the comb filter, a second input for receiving a chroma signal from the S-video signal source, and a third input for receiving the second control signal from the controller and an output for providing a selected one of the combed chroma output and the chroma signal output from the S-video signal source in response thereto.

BRIEF DESCRIPTION OF THE SEVERAL VIEWS OF THE DRAWING

The invention will be described with reference to the accompanying drawings wherein like elements are denoted by like reference designators, wherein.

DETAILED DESCRIPTION OF THE INVENTION

Figure 3:
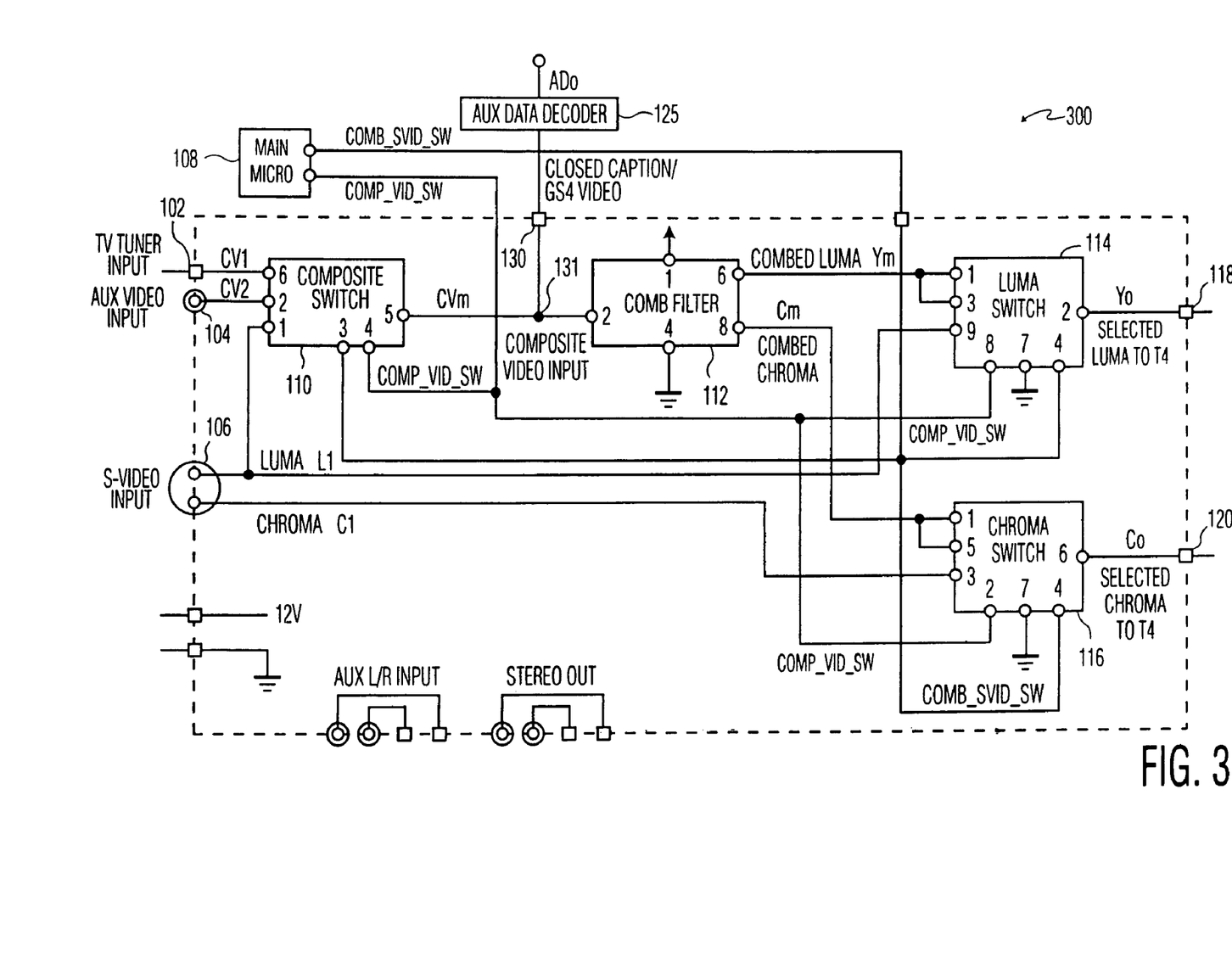
FIG. 3 is a block diagram of a television signal apparatus in accordance with the present invention, wherein the take off point for data services is disposed at a point in the signal path prior to comb filtering.

FIG. 3 illustrates an exemplary embodiment of television apparatus 300 according to the present invention. Apparatus 300 receives an input signal from one of TV tuner input 102, Aux Video input 104, and S-Video input 106, and provides luma output signal Yo at output 118 and chroma output signal Co at output 120. For television receiver applications, the video source inputs may include, e.g., a conventional tuner, IF amplifier and detector. The source inputs may also include baseband video inputs. For television monitor applications the tuner may be omitted. As known by those skilled in the art, chroma output signal Co is demodulated by a chrominance demodulation unit (not shown) to form color difference signals, and a matrix processor and a driver unit (not shown) combine and process the output luma signal Yo and the color difference signals to produce RGB signals to drive a display unit (not shown).

The composite video signals CV1 and CV2 from inputs 102 and 104, and the LUMA signal L1 from input 106 are applied as inputs to composite switch 110. Here, luma signal L1 is applied to a previously unused input of composite switch 110. Composite switch 110 provides a selected one of the input signals as input signal CVm to comb filter 112 in response to control signal Comp_Vid_SW from main processor 108. Comb filter 112 separates the luminance and chrominance components of signal CVm to produce combed luma signal Ym and combed chroma signal Cm. Comb filter 112 may be of a conventional design, comprising first and second subtractors, an adder, a one line delay, a low pass filter and a bandpass filter.

In comb filter 112, the combed chroma signal Cm is developed as follows. The input signal CVm is converted by an A/D converter and fed to a one line delay. The output of the one line delay is fed to a first subtractor. The output signal of the first subtractor 117 is filtered by band pass filter (BPF), thereby removing the line to line luma variations (i.e., vertical detail). The resultant BP filtered signal contains the recovered chroma information from the input video signal. The BP filtered signal also contains any luminance vertical detail information within the passband of the BPF. A switch then couples the BP filtered signal to the chroma D/A converter during the "normal" comb filtering mode. Additionally, the switch couples the BP filtered signal to an input of subtractor.

In comb filter 112, the luma output signal Ym is developed as follows. The subtractor subtracts the BP filtered (chroma) signal from the input video (luma+chroma) signal to produce a second difference signal, which contains primarily luminance components. The second difference signal is essentially the luminance component without the luminance vertical detail within the passband of BPF. This second difference signal is coupled to a first input of the adder. The first video difference signal (chroma+VD) is low pass filtered, thereby removing the chroma information while leaving the low frequency line to line luma variations (i.e., low frequency vertical detail information). The resultant low frequency vertical detail signal is coupled to a second input of the adder. Adder 127 adds the vertical detail signal and the second difference signal (luma) to produce signal Lo containing luminance information with enhanced vertical detail information. The output luma signal from the adder is coupled to the luma D/A converter.

Combed output signals Ym and Cm are provided as inputs to luma switch 114 and chroma switch 116, respectively. The luma and chroma components L1 and C1 of the input signal from S-Video input 106 are also provided to the respective inputs of luma switch 114 and chroma switch 116. Luma switch 114 and chroma switch 116 selects the desired one the respective input signals in response to signals Comb_SVid_SW and Comp_Vid_SW from main processor 108. Here, the control signal Comp_Vid_SW, which is applied to composite switch 110, is also applied to luma switch 114 and chroma switch 116.

The output of luma switch 114 and chroma switch 116 may be applied to a demodulation unit, a matrix process and driver unit, a display unit and associated control circuitry, which may all be of conventional design, the details of which are largely omitted.

The input of auxiliary data decoder 125 is coupled between composite switch 110 and comb filter 112. In the exemplary embodiment, the input of auxiliary data decoder is coupled to a point 131 disposed between composite switch 110 and comb filter 112. It will be appreciated that the connector between composite switch 110 and comb filter 112, and thus point 131, may take many forms known to those skilled in the art depending on the actual embodiment of these elements, for example in an IC or as discrete elements. Auxiliary data processor 125 provides an output signal ADo that is suitable for further processing and/or display. Auxiliary data decoder 125 may be of conventional design, the details of which are well known to those skilled in the art. Alternatively, the auxiliary data decoding function may be performed by a system microprocessor. It can be seen that the input signal to auxiliary data decoder 125 corresponds to the composite signal CVm provided from composite switch 110.

If a user selects TV tuner input 102, main processor 108 generates the appropriate signals Comp_Vid_SW and Comb_SVid_SW to cause composite switch 110 to select composite signal CV1 from TV tuner 102, luma switch 114 to select combed luma signal Ym, and chroma switch 116 to select combed chroma signal Cm. If the user selects aux video input 104, main processor 108 generates the appropriate signals Comp_Vid_SW and Comb_SVid_SW to cause composite switch 110 to select composite signal CV2 from aux video input 104, luma switch 114 to select combed luma signal Ym, and chroma switch 116 to select combed chroma signal Cm. Finally, if the user selects S-Video input 106, main processor 108 generates the appropriate signals Comp_Vid_SW and Comb_SVid_SW to cause composite switch 110 to select luma signal L1 from S-Video input 106, luma switch 114 to select luma signal L1 and chroma switch 116 to select chroma signal C1. It can be seen that in all three cases, auxiliary data decoder 125 receives the appropriate signal with respect to the displayed signal, prior to comb filtering of the signal, and the desired output signals are provided at outputs 118 and 120. Thus, the data corruption problem mentioned above is overcome.

Advantageously, composite switch 110 is in the form of an IC, such as LA7221, manufactured by Sanyo Corporation. In the prior art arrangements of FIGS. 1 and 2, composite switch 110 was controlled by a single control signal Comp_Vid_SW. Luma switch 114 and chroma switch 116 were also controlled by a single control switch Comp_Vid_SW. However, a single control signal Comp_Vid_SW is insufficient for selecting between three inputs. It may be impractical to re-design both the hardware and the software to accommodate the new switching requirements. To overcome this problem, the inventors have recognized that the previously unused grounded control input line CTL1 of composite switch 110 could be used to control the selection between the three input signals. In this regard, composite switch 110 receives both control signals Comb_Svid_SW and Comp_Vid_SW. The switching operation is described below.

Figure 4A:
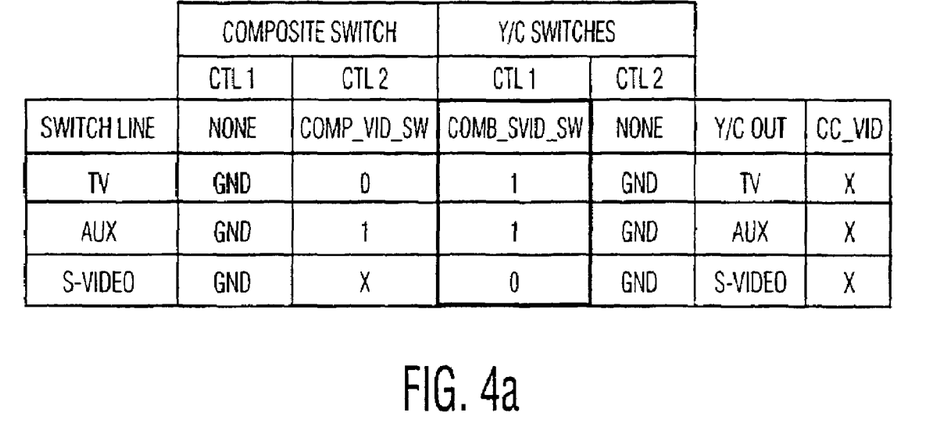
FIG. 4 is a table illustrating the signal states associated with various input signals for the apparatus of FIG. 3.
Figure 4B:
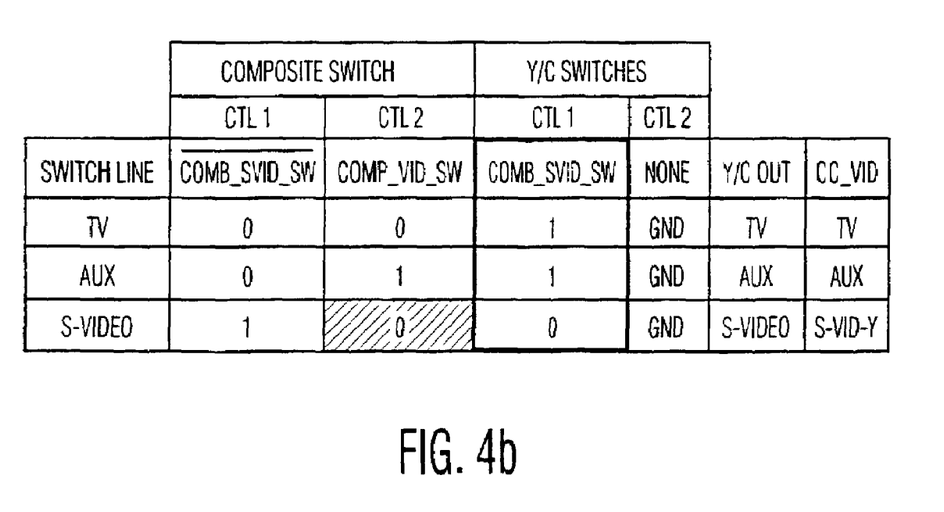

The charts of FIGS. 4a and 4b illustrate the switching functions before and after the problem solution. The chart of FIG. 4a illustrates the switching associated with the arrangement of FIG. 1, wherein input CTL1 of composite switch 110 is grounded and does not affect the output of composite switch 110. The combination of control signal Comp_Vid_Sw to composite switch 110 and control signal Comb_SVid_Sw to Y/C switches 114 and 116 control which one of the TV, auxiliary and S-Video signals are provided at outputs 118 and 120. Specifically, the output of composite switch 110 is controlled by the state of Comb_SVid_SW and the outputs of luma switch 114 and chroma switch 116 are controlled by the state of Comp_SVid_SW.

The chart of FIG. 4b illustrates the switching associated with the arrangement of FIG. 3, wherein the control signal Comb_SVid_SW is now coupled to input CTL1 of composite switch 110. By coupling the control signal Comb_SVid_Sw to composite switch 110, composite switch 110 can now be controlled to select one of three separate inputs, namely TV, auxiliary, and S-video luma. In this manner, switches 110, 114 and 116 can be controlled to select one of the desire signal inputs with minimal changes to the existing hardware and software. Furthermore, since auxiliary data decoder 125 is coupled to the output of composite switch 110, the new auxiliary data take off point receives the correct signal to be processed regardless of the input signal selected for display.

Figure 5:
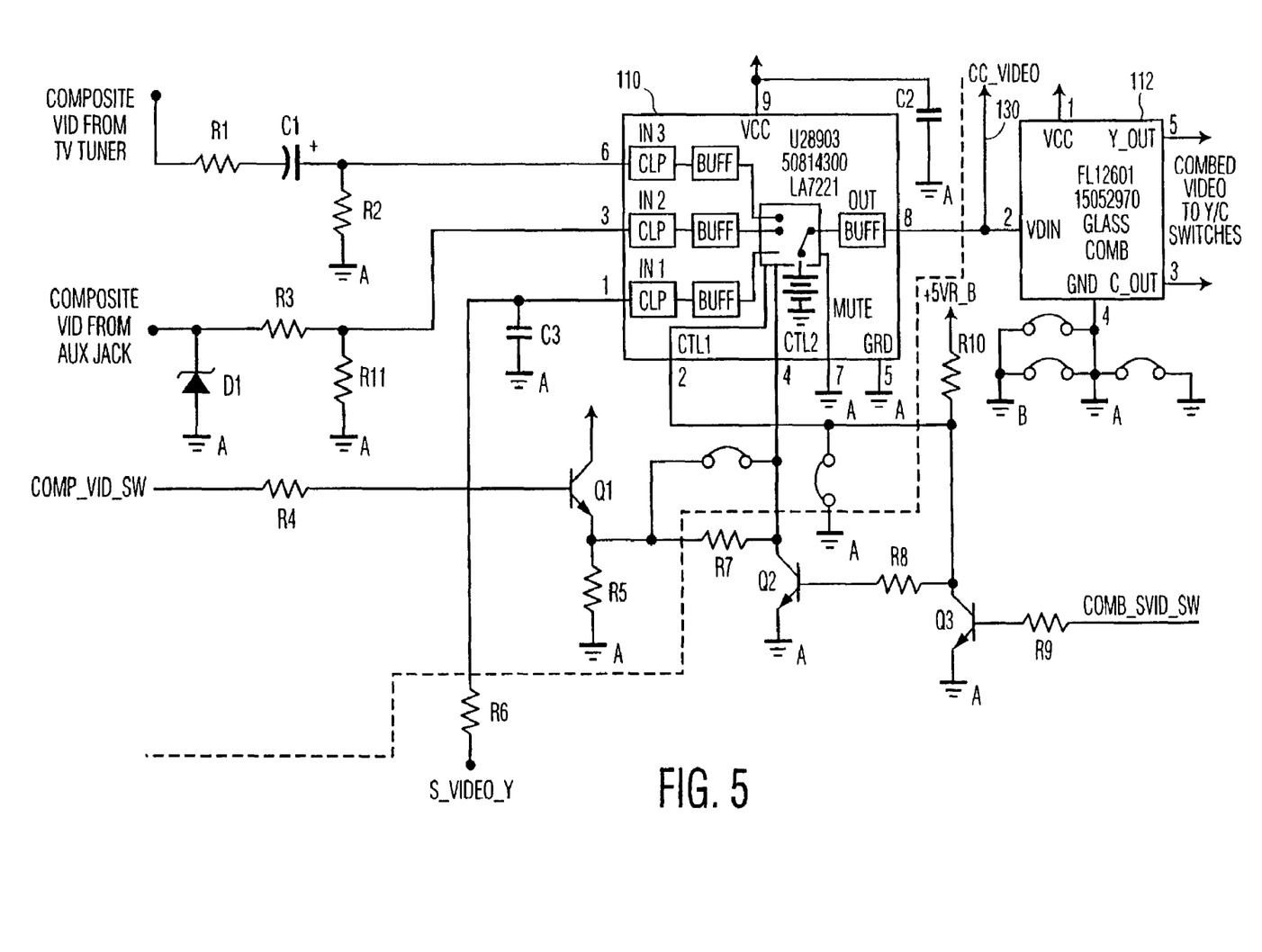
FIG. 5 is a detailed circuit diagram illustrating the composite signal switch, the comb filter and the various inputs associated with the signal apparatus of FIG. 3.

FIG. 5 illustrates a schematic diagram of the arrangement of composite switch 110, comb filter 112, and the various inputs of apparatus 300. In the present embodiment, composite switch 110 comprises LA7221 manufactured by Sanyo Corporation. The changes for overcoming the above-described problem includes adding the luma component L1 of the S-Video signal to pin 1 of composite switch 110 via R6 such that luma component L1 can be switched out to auxiliary data decoder 125 via output 130 as desired, and providing control signal comb_SVid_SW to input CTL1. This is necessary to allow S-video to be selected for Y/C output. To accomplish the switching of luma component L1 to data decoder 125, signal Comb_SVid_SW is inverted by Q3 and fed to the previously grounded CTL1 input at pin 2. Additionally, the inverted Comb_SVid_SW signal at the collector of Q3 is inverted again by Q2 and used to force CTL2 input at pin 4 of composite switch 110 to be LOW regardless of the state of the signal Comp_Vid_SW. When S-video is not selected, the second inverter Q2 is inactive and only the Comp_Vid_SW line controls the CTL2 input of composite switch 110, which essentially corresponds to the arrangement before these changes.

It will be apparent to those skilled in the art, that although the invention has been described in terms of specific examples, modifications and changes may be made to the disclosed embodiments without departing from the essence of the invention. It is, therefore, to be understood, that the appended claims are intended to cover all modifications that naturally flow from the foregoing description and examples. The exemplary embodiment is described above with respect to a television system, where information in the VBI may be corrupted due to the comb filtering of the television signal. The problem of corrupted data is overcome by placing the takeoff point at a point in the signal path prior to comb filtering. However, it is important to note that while the invention has been described in terms of comb filter for use in a television system, the invention is applicable to any system in which data is placed into a blanked interval of a video signal, which data is susceptible to being corrupted by comb filtering techniques.

What is claimed is:

1. A video signal processing apparatus for preventing data corruption from video related enhancements, comprising:
   a composite switch having a first video signal input coupled to a television tuner, a second video signal input coupled to an auxiliary video source, a third video signal input coupled to a source of luma signal from a S-video signal source, the composite switch providing an output video signal from a selected one of the video signal inputs in response to control signals from a controller coupled to the composite switch, the output video signal having a component that includes auxiliary data information;
   a comb filter coupled to the composite switch for comb filtering the output video signal to provide an output luma signal and an output chroma signal at respective first and second outputs; and
   a data processor, having an input coupled between the composite switch and the comb filter for receiving the video output signal and decoding auxiliary data included in the video output signal and providing a decoded output signal, wherein
   a first signal switch coupled to the comb filter and the S-video signal source for selecting either the output luma signal from the comb filter or the luma signal from the S-video signal source in response to a first control signal generated by the controller,
   a second signal switch coupled to the comb filter and the S-video signal source for selecting either the output chroma signal from the comb filter or the chroma signal from the S-video signal source in response to the first control signal generated by the controller, and
   the composite switch selecting a signal from one of the first, second, and third video signal inputs in response to the first control signal and a combination signal formed from the first control signal and a second control signal generated by the controller.

2. The apparatus of claim 1, wherein the first control signal is coupled to the composite switch via a first inverter and the first control signal is coupled to the second control signal through the first inverter and a second inverter to form the combination signal that is coupled to the composite switch.

* * * * *